United States Patent
Kang et al.

(10) Patent No.: US 8,394,532 B2
(45) Date of Patent: Mar. 12, 2013

(54) NEGATIVE ACTIVE MATERIAL FOR A RECHARGEABLE LITHIUM BATTERY, A METHOD OF PREPARING THE SAME, AND A RECHARGEABLE LITHIUM BATTERY COMPRISING THE SAME

(75) Inventors: Yong-Mook Kang, Yongin-si (KR);
Nam-Soon Choi, Yongin-si (KR);
Sung-Soo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 796 days.

(21) Appl. No.: 11/604,099

(22) Filed: Nov. 22, 2006

(65) Prior Publication Data
US 2007/0122712 A1    May 31, 2007

(30) Foreign Application Priority Data
Nov. 30, 2005   (KR) ........................ 10-2005-0116028

(51) Int. Cl.
*H01M 4/36*   (2006.01)
*H01M 4/13*   (2010.01)

(52) U.S. Cl. .................................................. 429/218.1

(58) Field of Classification Search .................... 429/232
See application file for complete search history.

(56) References Cited

U.S. PATENT DOCUMENTS

| | | | |
|---|---|---|---|
| 5,292,601 A | 3/1994 | Sugeno et al. | |
| 5,705,291 A | 1/1998 | Amatucci et al. | |
| 5,910,382 A | 6/1999 | Goodenough et al. | |
| 6,174,623 B1 | 1/2001 | Shackle | |
| 6,255,019 B1 | 7/2001 | Sakamoto et al. | |
| 6,258,483 B1 | 7/2001 | Abe | |
| 6,338,917 B1 | 1/2002 | Maeda et al. | |
| 6,440,610 B1 | 8/2002 | Sheem et al. | |
| 6,485,858 B1 | 11/2002 | Baker et al. | |
| 6,492,061 B1 | 12/2002 | Gauthier et al. | |
| 6,534,217 B2 | 3/2003 | Koga et al. | |
| 6,537,701 B1 | 3/2003 | Nimon et al. | |
| 6,548,210 B1 | 4/2003 | Shinyama et al. | |
| 6,558,841 B1 * | 5/2003 | Nakagiri et al. | 429/218.1 |
| 6,562,516 B2 | 5/2003 | Ohta et al. | |
| 6,573,006 B2 | 6/2003 | Nishiyama et al. | |
| 2001/0018148 A1 | 8/2001 | Ohta et al. | |

(Continued)

FOREIGN PATENT DOCUMENTS

| JP | 09-055210 | 2/1997 |
|---|---|---|
| JP | 11-016566 | 1/1999 |

(Continued)

OTHER PUBLICATIONS

Patent Abstracts of Japan, Publication No. 2005-044672; Date of Publication: Feb. 17, 2005; in the name of Yoshiki Sakaguchi et al.

(Continued)

*Primary Examiner* — Barbara Gilliam
*Assistant Examiner* — Stephan Essex
(74) *Attorney, Agent, or Firm* — Christie, Parker & Hale, LLP

(57) ABSTRACT

Negative active materials for rechargeable lithium batteries, methods of manufacturing the negative active materials, and rechargeable lithium batteries including the negative active materials are provided. One negative active material includes an active metal core and a crack inhibiting layer formed on the core. The crack inhibiting layer includes a carbon-based material.

15 Claims, 9 Drawing Sheets

U.S. PATENT DOCUMENTS

| | | | |
|---|---|---|---|
| 2005/0233213 A1* | 10/2005 | Lee et al. | 429/218.1 |
| 2006/0234127 A1* | 10/2006 | Kim et al. | 429/232 |
| 2007/0122712 A1 | 5/2007 | Kang et al. | |

FOREIGN PATENT DOCUMENTS

| | | |
|---|---|---|
| JP | 11-185758 | 7/1999 |
| JP | 11-283629 | 10/1999 |
| JP | 11-307116 | 11/1999 |
| JP | 2001-202958 | 7/2001 |
| JP | 2005-44672 | 2/2005 |
| KR | 10-2003-0013553 | 2/2003 |
| KR | 2003-0021112 | 3/2003 |
| KR | 2003-0028241 | 4/2003 |
| KR | 10-2004-0026207 | 3/2004 |
| KR | 10-2004-0096203 | 11/2004 |
| KR | 10-2005-0013841 | 2/2005 |
| WO | WO 2004114439 A1 * | 12/2004 |

OTHER PUBLICATIONS

Korean Patent Abstracts, Publication No. 1020030021112 A; Date of Publication: Mar. 12, 2003; in the name of Jae Pil Cho et al.

Korean Patent Abstracts, Publication No. 1020030028241 A; Date of Publication: Apr. 8, 2003; in the name of Sang Jin Kim et al.

Korean Patent Abstracts, Publication No. 1020050013841 A; Date of Publication: Feb. 5, 2005; in the name of Moon Ki Hong et al.

U.S. Office action dated Apr. 6, 2010, for related U.S. Appl. No. 11/607,817.

Patent Abstracts of Japan and machine translation of Japanese Publication 11-307116 dated Nov. 5, 1999 listed above.

Patent Abstracts of Japan and machine translation of Japanese Publication 2001-202958 dated Jul. 27, 2001 listed above.

U.S. Office action dated Sep. 3, 2010, for cross reference U.S. Appl. No. 11/607,817.

U.S. Office action dated May 9, 2011, for cross reference U.S. Appl. No. 11/607,817, 13 pages.

U.S. Notice of Allowance dated Jun. 8, 2012, for cross reference U.S. Appl. No. 13/328,910, (6 pages).

U.S. Notice of Allowance dated Sep. 23, 2011, for cross reference U.S. Appl. No. 11/607,817, 8 pages.

U.S. Notice of Allowance dated Apr. 12, 2012, for cross reference U.S. Appl. No. 13/328,910, (6 pages).

U.S. Office action dated Jan. 12, 2012, for cross reference U.S. Appl. No. 13/328,910, 7 pages.

* cited by examiner

NEGATIVE ACTIVE MATERIAL FOR A RECHARGEABLE LITHIUM BATTERY, A METHOD OF PREPARING THE SAME, AND A RECHARGEABLE LITHIUM BATTERY COMPRISING THE SAME

CROSS-REFERENCE TO RELATED APPLICATION

This application claims priority to and the benefit of Korean Patent Application No. 10-2005-0116028 filed in the Korean Intellectual Property Office on Nov. 30, 2005, the entire content of which is incorporated herein by reference.

FIELD OF THE INVENTION

The present invention relates to negative active materials for rechargeable lithium batteries, methods of manufacturing the same, and rechargeable lithium batteries including the same.

BACKGROUND OF THE INVENTION

The use of portable electronic instruments is increasing as electronic equipment gets smaller and lighter due to developments in high-tech electronic industries. Therefore, studies on high-capacity negative active materials are actively being pursued in accordance with an increased need for batteries having high energy densities for use as power sources in these portable electronic instruments. Even though graphite is suggested for the negative active material as it has a theoretical capacity of 372 mAh/g, a novel material having a higher capacity than graphite is still needed.

Elemental materials such as Si, Sn, and Al have been developed as substitutions for the graphite. The elemental materials are known to alloy with lithium and have higher electric capacities than graphite.

However, elemental materials themselves have not yet been commercialized as negative active materials because the elements such as Si, Sn, Al, and so on form alloys with lithium during charge-discharge and undergo volume expansion and contraction resulting in element pulverization. As a result, the cycle-life of the batteries may be deteriorated.

Recently, certain materials have been proposed as substitutes for the conventional graphite material. One such substitute includes a simple mixture of a graphite and silicon compound powder. Another proposed substitute includes a material in which a pulverized silicon compound is chemically fixed on the surface of graphite by a silane coupling agent. A third substitute includes a material in which a metal such as Si is bound with or coated on a graphite-based carbonaceous material.

However, in the simple mixture of a graphite and silicon compound powder, the graphite does not completely contact the silicon compound. As a result, the silicon compound is released from the graphite when the graphite is expanded or contracted upon repeated charge and discharge cycles. Thereby, as the silicon compound has low electro-conductivity, the silicon compound is insufficiently utilized for negative active materials and the cycle characteristics of the rechargeable lithium battery are deteriorated.

In addition, the material in which the pulverized silicon compound is chemically fixed on the surface of graphite by a silane coupling agent works as a negative active material (similar to graphite) at the early charge and discharge cycles. However, the silicon compound expands when it is alloyed with the lithium upon repeated charge and discharge cycles. Thereby, the linkage of the silane coupling agent is broken to release the silicon compound from the graphite such that the silicon compound is insufficiently utilized as a negative active material. As a result, the cycle characteristics of the rechargeable lithium battery are deteriorated. Further, the silane coupling agent may not be uniformly treated upon preparing the negative electrode material so that it is difficult to provide a negative electrode material having consistent quality.

Further, the material in which a metal such as Si is bound with or coated on the graphite-based carbonaceous material has the same problems. That is, upon repeated charge and discharge cycles, the linkage of the amorphous carbonaceous material is broken upon expanding the metal alloyed with the lithium. Thereby, the metal is separated and thus is not sufficiently utilized as a negative active material. As a result, cycle-life characteristics of the lithium rechargeable battery are deteriorated.

SUMMARY OF THE INVENTION

One embodiment of the present invention provides a negative active material for a rechargeable lithium battery which imparts improved cycle-life characteristics.

Another embodiment of the present invention provides a negative active material for a rechargeable lithium battery which imparts excellent initial efficiency.

Yet another embodiment of the present invention provides a method of manufacturing the negative active material having the above properties for a rechargeable lithium battery.

Still another embodiment of the present invention provides a rechargeable lithium battery including the above negative active material.

According to one embodiment of the present invention, a negative active material for a rechargeable lithium battery includes an active metal core and a crack inhibiting layer including a carbon-based material disposed on a surface of the core.

The active metal may be selected from Si, Sn, Al, Zn, Pb, Bi, Ag, Cd, Sb, and combinations thereof. The carbon-based material may be selected from carbon fibers, carbon nanotubes, carbon nanowires, soft carbon, hard carbon, and combinations thereof. The active metal particles may have an average particle diameter of about 50 µm or less. According to one embodiment, the active metal particles have an average particle diameter ranging from about 1 to about 40 µm. In another embodiment, the active metal particles have an average particle diameter ranging from about 1 to about 30 µm. In yet another embodiment, the active metal particles have an average particle diameter ranging from about 1 to about 20 µm. In still another embodiment, the active metal particles have an average particle diameter ranging from about 1 to about 10 µm.

The carbon-based material may have an average particle diameter ranging from about 5 nm to about 5 µm. According to one embodiment, the carbon-based material has an average particle diameter ranging from about 100 nm to about 1 µm. A ratio of the thickness of the crack inhibiting layer to the average particle diameter of the active metal particles ranges from about 1/1000 to about 1/2. According to one embodiment, the ratio ranges from about 1/100 to about 1/10.

According to another embodiment of the present invention, a method of manufacturing the negative active material includes first preparing a coating liquid in which a carbon-based material is dispersed by adding a carbon-based material and a dispersing agent to a solvent. The acidity (pH) of the coating liquid is controlled to a value ranging from about 1 to about 6. Active metal particles are then added to a surfactant suspension to prepare a suspension including active metal particles coated with the surfactant. The coating liquid and the suspension are then mixed and the acidity (pH) of the mixture is controlled to a value ranging from about 1 to about 6. The mixture is then heat-treated.

According to yet another embodiment of the present invention, a rechargeable lithium battery includes a negative electrode including the above negative active material, a positive electrode including a positive active material capable of reversibly intercalating and deintercalating lithium, and an electrolyte.

BRIEF DESCRIPTION OF THE DRAWINGS

These and other features and advantages of the present invention will be better understood with reference to the following detailed description when considered in conjunction with the accompanying drawings in which.

DETAILED DESCRIPTION

Figure 1:
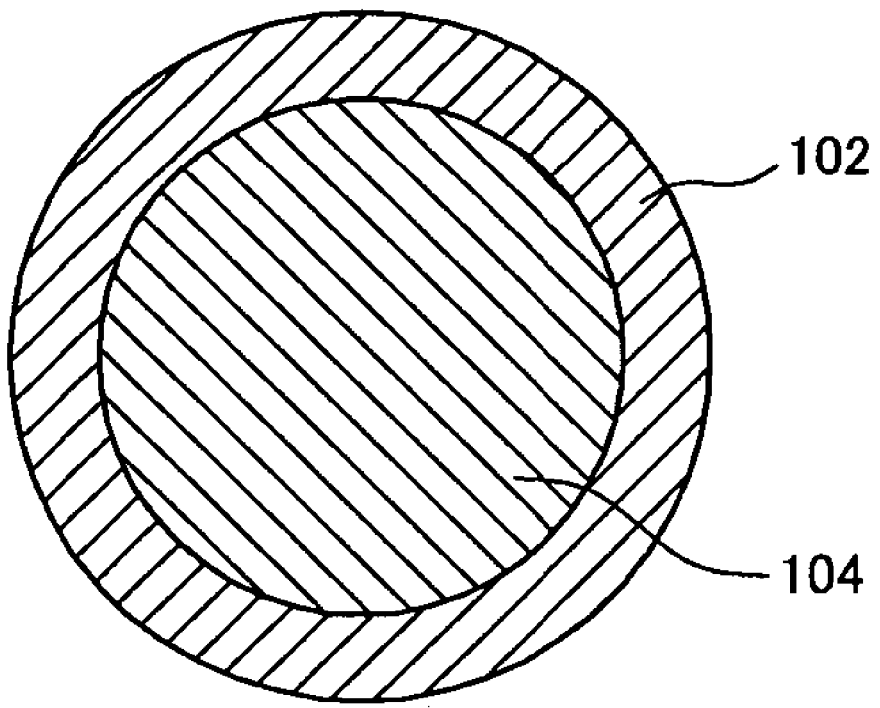
FIG. 1 is a cross-sectional view of a negative active material according to one embodiment of the present invention.

An exemplary embodiment of the present invention will now be described with reference to the accompanying drawings.

When a metal-based active material is used as a negative active material for a rechargeable lithium battery, lithium ions move to the negative electrode during charging and are alloyed with the metal-based active material, thereby expanding the volume. However, lithium ions move to the positive electrode during discharging, thereby contracting the volume. When these processes are repeated, the metal-based active material pulverizes, i.e., it starts to crack, and then finally breaks into minute particles. In addition, the active material separates from the current collector or the conductive material in the negative electrode, thereby becoming electrically insulated therefrom. Therefore, as a rechargeable battery is repeatedly charged and discharged, the electric conductivity of the negative electrode gradually weakens, resulting in decreased battery efficiency.

According to one embodiment of the present invention, the negative active material includes an active metal core and a crack inhibiting layer including a carbon-based material disposed on a surface of the core.

The active metal may be any metal that can be alloyed with lithium during an electrochemical reaction within the cell. Nonlimiting examples of suitable active metals include Si, Sn, Al, Zn, Pb, Bi, Ag, Cd, Sb, and combinations thereof. In one embodiment, the active metal is selected from Si and Sn, which have large capacities.

The crack inhibiting layer of the negative active material includes a conductive material and suppresses volume expansion of the active metal particles, thereby improving the electric conductivity of the negative active material. The conductive material includes crystalline or amorphous carbon-based materials. Nonlimiting examples of suitable crystalline carbon materials include plate-shaped, flake-shaped, spherical, or fiber-shaped natural or artificial graphite, including carbon fiber, carbon nanotubes, carbon nanowires, carbon nanohorns, and so on. Nonlimiting examples of suitable amorphous carbon materials include soft carbon (carbon obtained by firing at a low temperature), hard carbon, mesophase pitch carbide, fired cokes, and so on.

In one embodiment, the crystalline carbon has an X-ray diffraction peak intensity I(110) at a (110) plane and an X-ray diffraction peak intensity I(002) at a (002) plane, and an intensity ratio I(110)/I(002) of about 0.2 or less. According to one embodiment, the crystalline carbon has an intensity ratio I(110)/I(002) of about 0.04 or less. In another embodiment, the crystalline carbon has an intensity ratio I(110)/I(002) ranging from about 0.002 to about 0.2. In yet another embodiment, the crystalline carbon has an intensity ratio I(110)/I(002) ranging from about 0.002 to about 0.04.

The active metal particles have an average particle diameter of about 50 μm or less. According to one embodiment, the active metal particles have an average particle diameter ranging from about 1 to about 40 μm. In another embodiment, the active metal particles have an average particle diameter ranging from about 1 to about 30 μm. In yet another embodiment, the active metal particles have an average particle diameter ranging from about 1 to about 20 μm. In still another embodiment, the active metal particles have an average particle diameter ranging from about 1 to about 10 μm. When the active metal particles have an average particle diameter greater than about 50 μm, the total surface area of the active metal particles decreases, resulting in a decrease in the reactivity of the negative active material.

The carbon-based materials have an average particle diameter ranging from about 5 nm to about 5 μm. According to one embodiment, the carbon-based materials have an average particle diameter ranging from about 100 nm to about 1 μm.

A ratio of the thickness of the crack inhibiting layer to the average particle diameter of the active metal particles ranges from about 1/1000 to about 1/2. In one embodiment, for example, the ratio ranges from about 1/100 to about 1/10. When the ratio is greater than about 1/2, the reactivity of the negative active material decreases. When the ratio is less than about 1/1000, suppression of volume expansion may be negligible.

FIG. 1 is a cross-sectional view of a negative active material 100 according to one embodiment of the present invention. As shown in FIG. 1, a negative active material of the present invention comprises a core 104 including active metal particles and a crack inhibiting layer 102 including carbon-based materials surrounding the core 104. The crack inhibiting layer 102 suppresses volume expansion of the active metal particles during charge, and thereby prevents cracks therein. In addition, the carbon-based materials in the crack inhibiting layer 102 are electrically conductive, and thereby appropriately prevent electric insulation of the negative active material from the current collector and conductive material.

Figure 2:
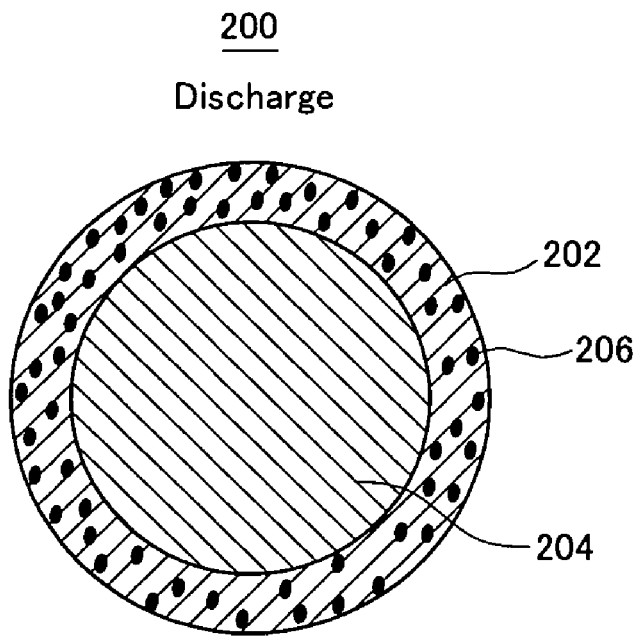
FIG. 2 is a schematic depicting cross-sectional views of a negative active material according to one embodiment of the invention showing changes in the active material when moving from a discharged state (top) to a charged state (bottom)
Figure 2:
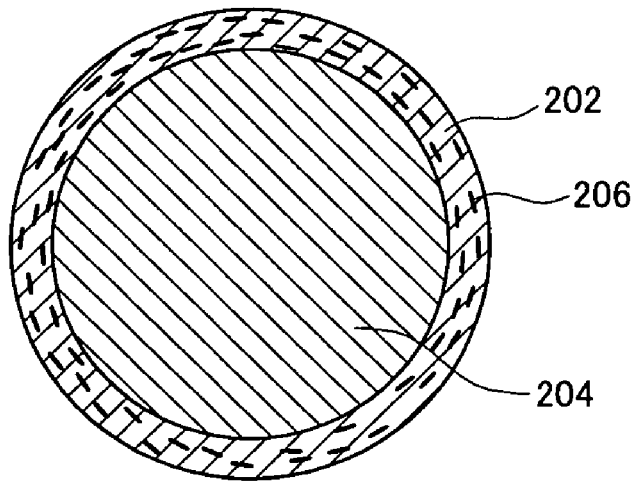

FIG. 2 is a schematic cross-sectional view of the states of the negative active material during discharge (top) and charge (bottom) according to one embodiment of the present invention. Referring to FIG. 2, even if the active metal particles 204 expand, the expanded active metal particles compress pores inside the crack inhibiting layer 202 surrounding the active metal particles 204, thereby contracting the volume of the pores. Accordingly, the volume of the negative active material including the active metal particles is not significantly changed. Therefore, separation of the negative active material from the conductive material and current collector inside the negative electrode is prevented.

The negative active materials of the present invention are not easily pulverized or separated from the conductive material and current collector, which phenomenon commonly occurs with conventional negative active materials. As a result, the negative active materials, enhance electric conductivity, and improve cycle-life characteristics and initial efficiencies of batteries.

According to an embodiment of the present invention, a negative active material includes a core including active metal particles and a crack inhibiting layer including carbon-based materials. The carbon-based materials may include silicon carbide on a portion of their surface.

When crystalline carbon is included in the crack inhibiting layer as the carbon-based materials, lithium ions are inserted among crystalline carbon plates, thereby forming lithiated carbon. Accordingly, a negative active material of the present invention may include lithiated carbon.

The negative active material for a rechargeable battery may be produced by first preparing a coating liquid in which carbon-based materials are dispersed by adding the carbon-based materials and a dispersing agent to a solvent. The acidity (pH) of the coating liquid is controlled to a value ranging from about 1 to about 6. Active metal particles are added to a surfactant suspension to prepare a suspension including active metal particles coated with the surfactant. The coating liquid and the suspension are mixed and the acidity (pH) of the mixture is controlled to a value ranging from about 1 to about 6. The mixture is then heat-treated.

First, the carbon-based materials and a dispersing agent are added to a solvent to disperse the carbon-based materials, yielding a coating liquid. Then, the acidity (pH) of the resulting coating liquid is controlled to about neutral. The pH may be controlled by adding a base such as ammonia, a buffer solution, and so on.

The carbon-based materials may include, but are not limited to, crystalline or amorphous carbon. Nonlimiting examples of suitable crystalline carbon materials include plate-shaped, flake-shaped, spherical or fiber-shaped natural graphite or artificial graphite. Nonlimiting examples of suitable amorphous carbon materials include soft carbon (carbon obtained by firing at a low temperature), hard carbon, mesophase pitch carbide, fired cokes, and so on.

Nonlimiting examples of suitable dispersing agents for dispersing the carbon-based materials include polyacrylate-based resins; polyethylene oxide; polypropylene oxide; block copolymers of $(EO)_l(PO)_m(EO)_l$ where EO is ethylene oxide, PO is propylene oxide, and l and m are integers ranging from 1 to 500; polyvinylchloride (PVC); acrylonitrile/butadiene/styrene (ABS) polymers; acrylonitrile/styrene/acrylester (ASA) polymers; mixtures of acrylonitrile/styrene/acrylester (ASA) polymers and propylene carbonate; styrene/acrylonitrile (SAN) copolymers; methylmethacrylate/acrylonitrile/butadiene/styrene (MABS) polymers; and so on. A resin of OROTAN™ may be used as the polyacrylate-based resin according to one embodiment of the present invention. The dispersing agent may be present in an amount ranging from about 0.1 to about 10 wt % based on the weight of the carbon-based materials.

Nonlimiting examples of suitable solvents for use in the manufacture of the negative active material include water, organic solvents, and mixtures thereof. Nonlimiting examples of suitable organic solvents include hexane, chloroform, tetrahydrofuran, ether, methylene chloride, acetone, acetonitrile, N-methyl pyrrolidone (NMP) and alcohols such as methanol, ethanol, and isopropanol. When the surfactant is an ionic compound, an organic solvent is suitable, and when the surfactant is a non-ionic compound, water is suitable.

The active metal particles are then added to the surfactant suspension to prepare a suspension including active metal particles coated with the surfactant.

The surfactant works as a binder to bind the carbon-based materials to the active metal particles. Non-ionic, anionic, and cationic materials, as well as organic or inorganic materials may be used as the surfactant. The surfactant includes a hydrophilic head group and a hydrophobic tail group in its respective molecules, where the hydrophilic head group includes an ionic group and a non-ionic group. The ionic group forms static electricity bonds, and the non-ionic group forms hydrogen bonds.

According to certain embodiments of the invention, non-limiting examples of compounds having an ionic group include sulfonates ($RSO_3^-$), sulfates ($RSO_4^-$), carboxylates ($RCOO^-$), phosphates ($RPO_4^-$), ammoniums ($R_xH_yN^+$ where x is an integer ranging from 1 to 3, and y is an integer ranging from 3 to 1), quaternary ammoniums ($R_4N^+$), betaines ($RN^+(CH_3)_2CH_2COO^-$), and sulfobetaines ($RN^+(CH_3)_2CH_2SO_3^-$). Nonlimiting examples of compounds having a non-ionic group include polyethylene oxides ($R-OCH_2CH_2(OCH_2CH_2)_nOH$), amine compounds, and gelatins. In the above compounds, R is a saturated or non-saturated hydrocarbon, where the number of carbons ranges from 2 to 1000. The surfactant has a weight average molecular weight ranging from about 5 to about 10,000. In one embodiment, the surfactant has a weight average molecular weight ranging from about 50 to about 5000. In another embodiment, surfactant has a weight average molecular weight ranging from about 50 to about 300.

According to an embodiment of the invention, the surfactant is present in an amount ranging from about 0.1 to about 10 wt % based on the weight of the carbon-based materials. When the surfactant is present in an amount within this range, the amount of the carbon-based materials to be coated on the active metal particles can be controlled.

Then, the above coating liquid including the carbon-based materials and the dispersing agent is mixed with an active metal suspension coated with a surfactant to form a suspension. The acidity (pH) of the suspension is controlled to a value ranging from about 1 to about 6. In one embodiment, the acidity (pH) of the suspension is controlled to a value ranging from about 2 to about 3. The carbon-based materials are coated on the surface of the active metal particles by the surfactant. In addition, the coating may be performed by simply mixing the coating liquid including the carbon-based material with the active metal suspension coated with the surfactant, but the coating method is not limited thereto.

The pH is controlled with addition of an acid such as acetic acid, hydrochloric acid, or sulfuric acid according to an embodiment of the invention.

When the surfactant has both anions and cations according to one embodiment of the invention, the pH of the mixed solution affects the amount of carbon-based materials coated on the active metal particles.

When the mixed solution is allowed to stand after its acidity (pH) is set, active metal particles coated with carbon-based materials precipitate, and can be easily recovered. The active metal particles may be filtered to remove the residue of the dispersing agent and uncoated surfactant.

The recovered active metal particles are heat-treated to obtain a negative active material. The heat-treatment temperature ranges from about 200 to about 1200° C. In one embodiment, for example, the heat-treatment temperature ranges from about 400 to about 700° C. The heat-treatment may be performed for a period of time ranging from about 1 to about 24 hours. The heat-treatment can remove the surfactant and dispersing agent used for dispersing the carbon-based materials. When the heat-treatment is performed at a temperature less than about 400° C., the surfactant may remain on the surface of the active material particles, negatively influencing the electrochemical characteristics of the battery. On the other hand, when the heat-treatment is performed at a temperature greater than about 700° C., the active metal particles may oxidize, thereby deteriorating electrochemical characteristics such as battery capacity.

According to another embodiment of the present invention, a lithium rechargeable battery includes a negative electrode including the above negative active material, a positive electrode including a positive active material capable of reversible intercalation and deintercalation of lithium, and an electrolyte.

The rechargeable lithium battery includes the inventive negative active materials, which are not pulverized and are easily detached from the conductive material and current collector. Such a lithium battery exhibits improved initial efficiency and cycle-life characteristics.

The negative active material is mixed with a binder and then applied to a current collector such as copper to form a negative electrode active mass and thereby fabricate a negative electrode. As needed, the active mass may include conductive materials.

Nonlimiting examples of suitable conductive materials include nickel powders, cobalt oxide, titanium oxide, carbon, and so on. Nonlimiting examples of suitable carbon materials for the conductive materials include ketjen black, acetylene black, furnace black, graphite, carbon fiber, fullerene, and so on. The graphite acts as an electrode structure supporter as well as a conductive material.

Nonlimiting examples of suitable binders include polyvinylidene fluoride, polyvinyl chloride, and so on.

Figure 3:
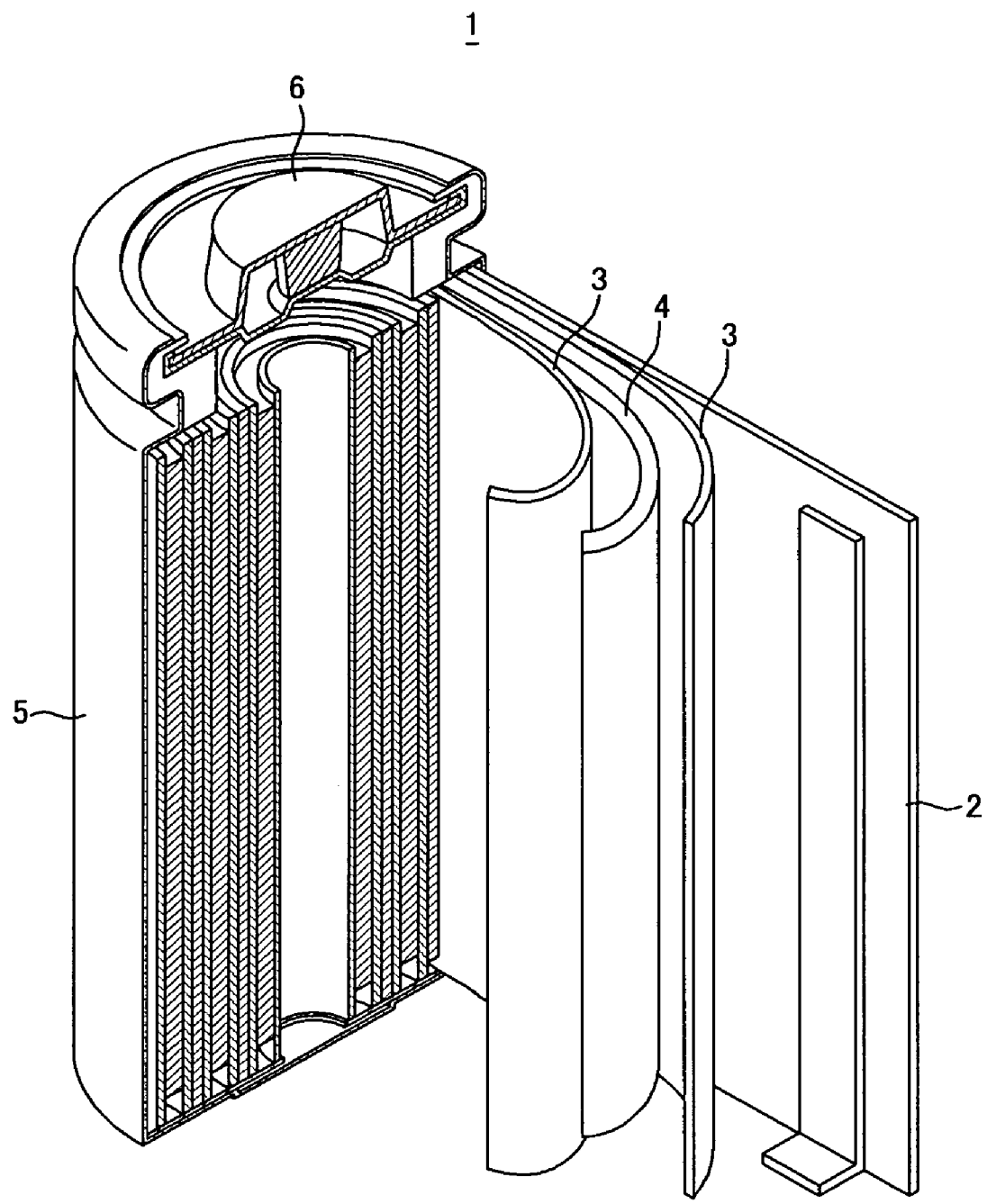
FIG. 3 is a perspective view of a rechargeable lithium battery according to one embodiment of the present invention.

FIG. 3 is a perspective view of a rechargeable lithium battery 1 according to one embodiment of the present invention. The rechargeable lithium battery 1 includes a negative electrode 2, a positive electrode 3, a separator 4 positioned between the positive electrode 3 and the negative electrode 2, and an electrolyte immersing the separator 4. In addition, the battery 1 includes a cell housing 5 and a sealing member 6 for sealing the cell housing 5. Even though the rechargeable lithium battery shown in FIG. 3 is cylindrical in shape, it may take various shapes such as prisms, coins, or sheets.

The positive electrode includes a positive active material, a conductive agent, and a binder. The positive active material may include a compound capable of reversibly intercalating/deintercalating lithium ions, such as $LiMn_2O_4$, $LiCoO_2$, $LiNiO_2$, $LiFeO_2$, $V_2O_5$, TiS, MoS, and so on. The separator may include an olefin-based porous film such as polyethylene, polypropylene, and so on.

An electrolyte of the present invention may include a lithium salt dissolved in a solvent. The solvent may be a non-aqueous organic solvent.

The non-aqueous organic solvent acts as a medium for transmitting ions taking part in the electrochemical reaction of the battery. Nonlimiting examples of suitable non-aqueous organic solvents include benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (where R is a C2 to C50 linear, branched, or cyclic hydrocarbon, a double bond, an aromatic ring, or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, sulfolane, valerolactone, decanolide, and mevalolactone. A single non-aqueous organic solvent may be used or a mixture of solvents may be used. When a mixture of organic solvents is used, the mixture ratio can be controlled according to the desired battery performance.

The lithium salt is dissolved in the non-aqueous organic solvent to supply lithium ions in the battery. The lithium salt facilitates basic operation of the rechargeable lithium battery, and facilitates the transmission of lithium ions between positive and negative electrodes. Non-limiting examples of suitable lithium salts include supporting electrolytic salts such as $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), LiCl, and LiI.

Further, instead of the above-mentioned electrolyte, a solid polymer electrolyte may be used. In this embodiment, a polymer having lithium ion-conductivity may be used. Nonlimiting examples of suitable polymers include polyethylene oxide, polypropylene oxide, polyethyleneimine, and so on. The polymer is used in a gel state such that the solvent and the solute are added to the polymer.

The following examples illustrate the exemplary embodiments of the present invention. However, these examples are presented for illustrative purposes only and do not limit the scope of the present invention.

EXAMPLE 1

100 Ml of water, 500 g of zirconia balls, 20 g of crystalline carbon fiber, and 0.5 g of Orotan™ (Hanjung Chem Co.) were put in a 300 Ml plastic bottle and then ball-milled for 2 hours to prepare a mixed solution in which the carbon fiber was completely dispersed. Then, 1 g of gelatin was dissolved in 200 Ml of water. 100 g of Si powder (average particle diameter of 10 μm) was added to the mixed solution, which was then agitated and the pH controlled at 7. The above carbon fiber dispersion solution was then added, and acetic acid was used to regulate the pH to 3 to 4. The resulting solution was agitated for 10 minutes and then allowed to stand for 1 to 2 minutes. Then, Si particles coated with carbon fiber precipitated to the bottom and were recovered. The Si particles coated with carbon fiber were fired at 500° C. to remove the gelatin, thereby preparing a negative active material.

The prepared negative active material and a nickel powder were added to a binder solution in which a polyvinylidene binder was dissolved in an N-methylpyrrolidone solvent and then mixed to prepare a negative active material slurry.

The prepared negative active material slurry was coated on a copper foil and then dried at 110°C. in a vacuum oven and compressed with a press, thereby preparing a negative electrode.

The negative electrode for a rechargeable lithium battery and a Li metal counter electrode were used to fabricate a half-cell. A solution of ethylene carbonate and diethylene carbonate (mixed in a volume ratio of 1:1), in which 1M $LiPF_6$ was dissolved, was used as an electrolyte.

EXAMPLE 2

A half cell was fabricated as in Example 1 except that carbon black having an average particle diameter of 10 nm was used instead of the crystalline carbon fiber.

EXAMPLE 3

A half cell was fabricated as in Example 1 except that carbon nanotubes were used instead of the crystalline carbon fiber.

COMPARATIVE EXAMPLE 1

A half cell was fabricated as in Example 1 except that Si powder was used as a negative active material.

Figure 4:
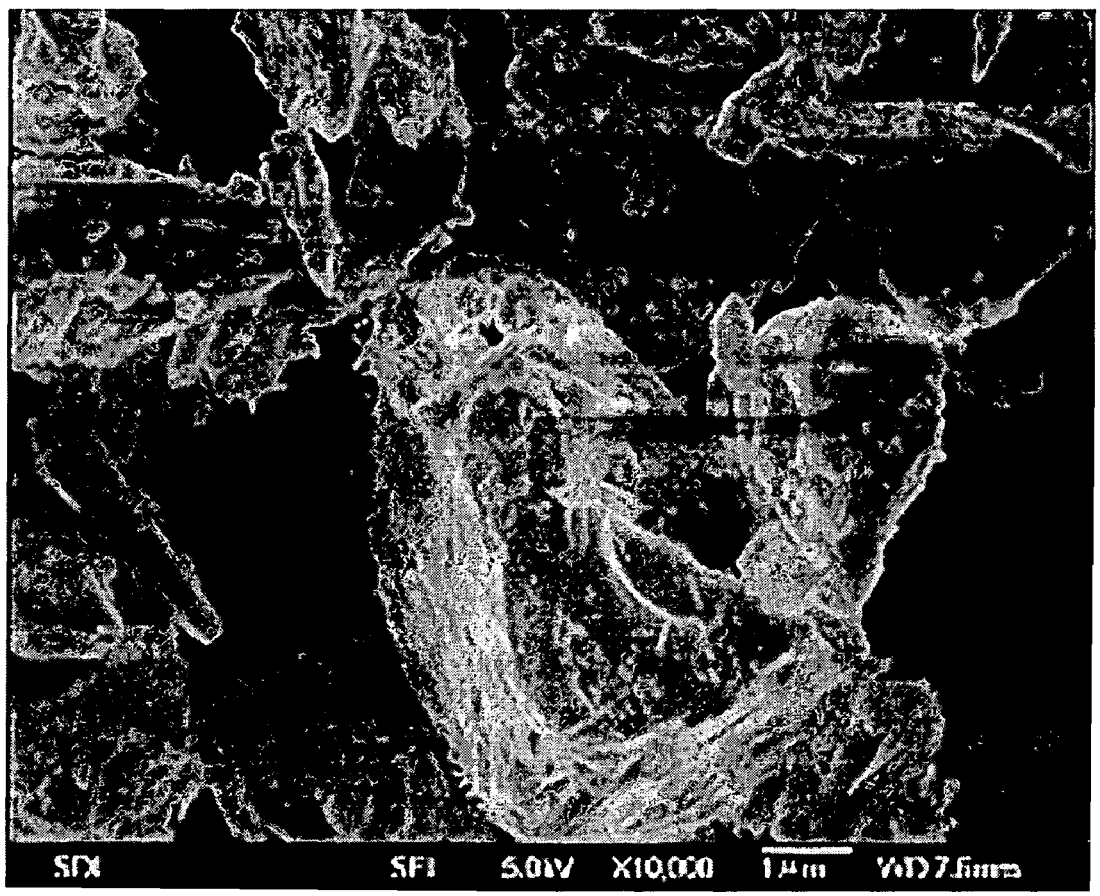
FIG. 4 is a scanning electron microscope (SEM) photograph of the negative active material prepared according to Example 1.
Figure 5:
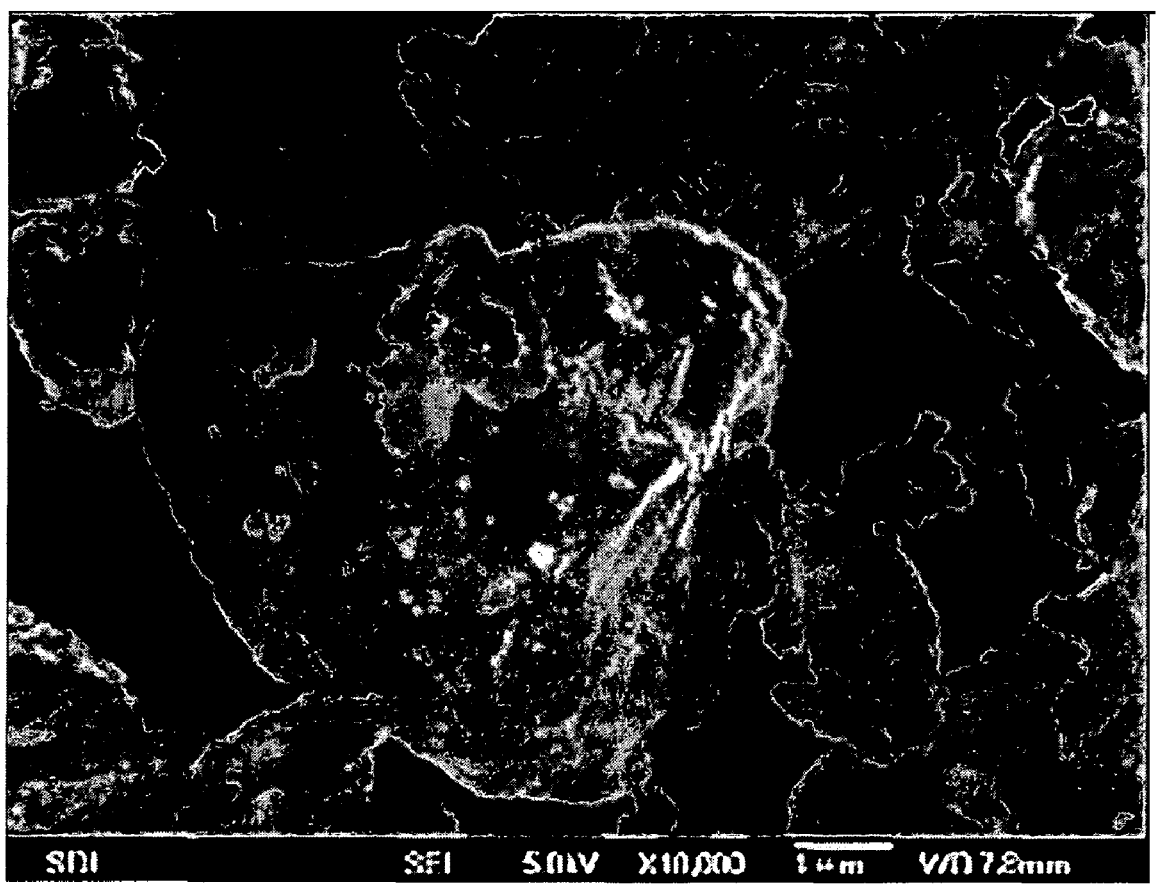
FIG. 5 is a SEM photograph of the negative active material prepared according to Comparative Example 1.

FIGS. 4 and 5 are scanning electron microscope (SEM) photographs of the negative active materials prepared according to Example 1 and Comparative Example 1, respectively. Unlike the negative active material prepared according to Comparative Example 1 and shown in FIG. 5, the negative active material prepared according to Example 1 and shown in FIG. 4 was uniformly coated with crystalline carbon.

Figure 6:
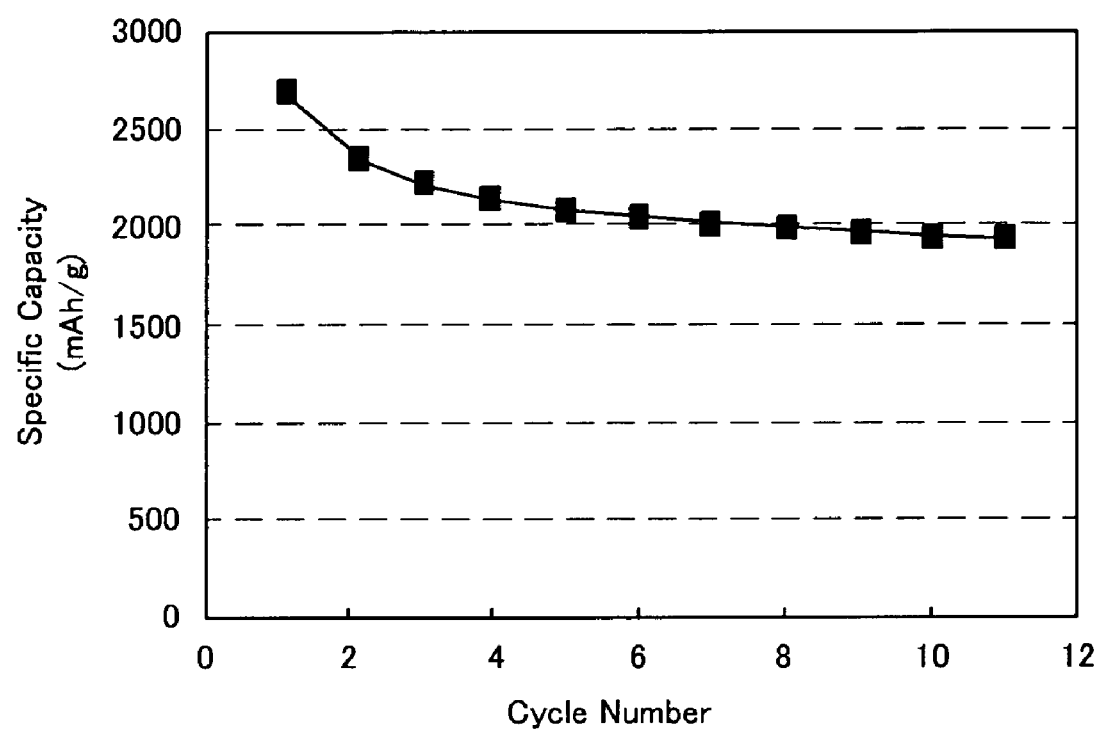
FIG. 6 is a graph of the cycle-life characteristics of the rechargeable lithium battery prepared according to Example 1.
Figure 7:
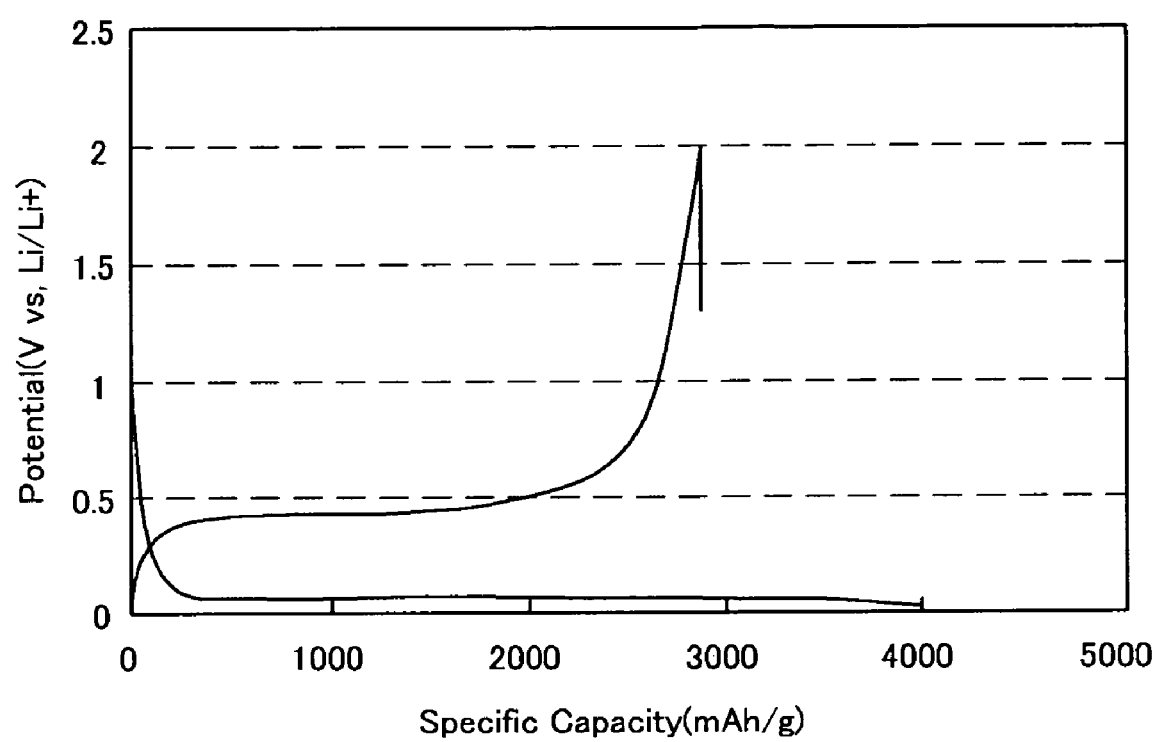
FIG. 7 is a graph of the charge and discharge characteristics of the rechargeable lithium battery prepared according to Example 1.
Figure 8:
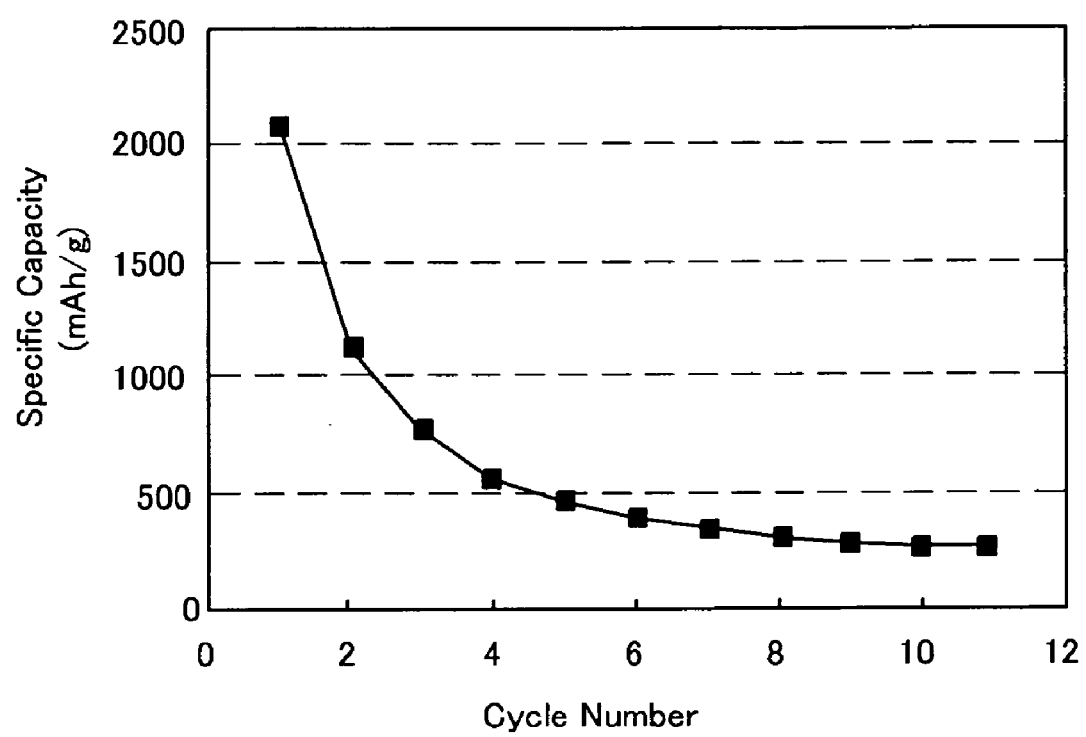
FIG. 8 is a graph of the cycle-life characteristics of the rechargeable lithium battery prepared according to Comparative Example 1.
Figure 9:
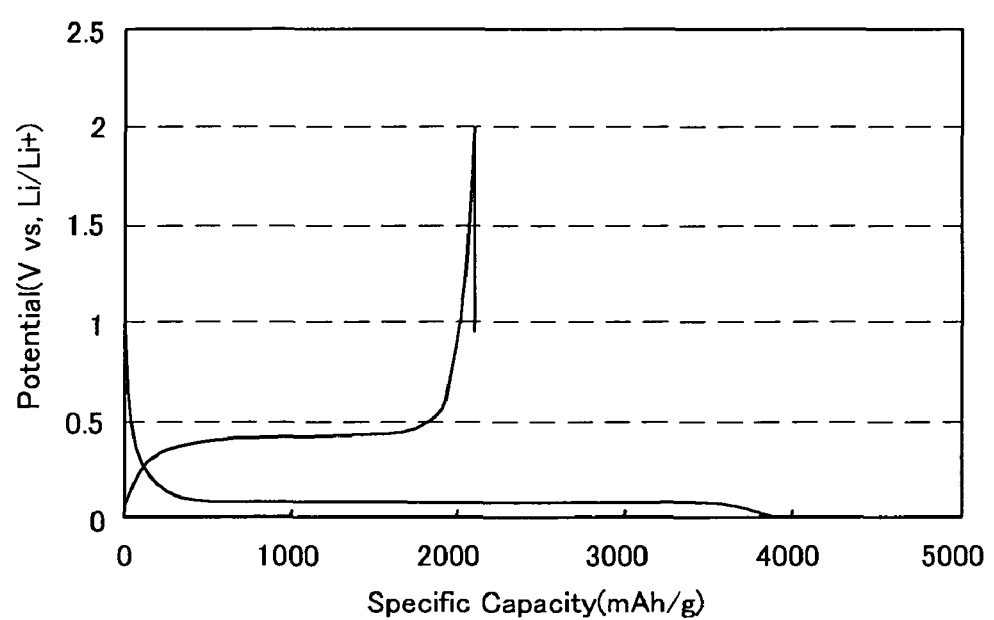
FIG. 9 is a graph of the charge and discharge characteristics of the rechargeable lithium battery prepared according to Comparative Example 1.

FIG. 6 is a graph of the cycle-life characteristics of the battery cell fabricated according to Example 1. FIG. 7 is a graph of the charge and discharge curve of the battery cell fabricated according to Example 1. FIG. 8 is a graph of the cycle-life characteristics of the battery cell fabricated according to Comparative Example 1, and FIG. 9 is a graph of the charge and discharge curve of the battery cell fabricated according to Comparative Example 1.

Judging from the results shown in FIGS. 6 through 8, Example 1 (using Si powder coated with carbon fiber as a negative active material) had much improved cycle-life characteristics and initial efficiency as compared to Comparative Example 1 (using Si powder without coating as a negative active material). Examples 2 and 3 showed results similar to Example 1.

Therefore, according to an exemplary embodiment, the inventive negative active materials for rechargeable lithium batteries avoids pulverization due to volume expansion of metal-based active materials, improves contact with the conductive material, and prevents separation from the current collector. According to such an embodiment, the inventive negative active materials thereby improve electro-conductivity of the negative electrode and the cycle-life characteristics of the rechargeable lithium battery and enhance the initial efficiency of the rechargeable lithium battery.

While certain exemplary embodiments of the invention have been described, it is understood by those of ordinary skill in the art that various modifications and alterations to the described embodiments may be made without departing from the spirit and scope of the invention, as described in the appended claims.

What is claimed is:

1. A negative active material for a rechargeable lithium battery comprising:
    an active metal core consisting essentially of active metal particles; and
    a crack inhibiting layer comprising a crystalline carbon-based material having changeable pores configured to be compressed upon expansion of the active metal core and to be expanded upon contraction of the active metal core, the crystalline carbon-based material physically contacting a surface of the active metal core, wherein the carbon-based material has an average particle diameter ranging from about 5 nm to about 5 µm.

2. The negative active material of claim 1, wherein the active metal core comprises an active metal selected from the group consisting of Si, Sn, Al, Zn, Pb, Bi, Ag, Cd, Sb, and combinations thereof.

3. The negative active material of claim 2, wherein the active metal is selected from the group consisting of Si, Sn, and combinations thereof.

4. The negative active material of claim 1, wherein the carbon-based material is selected from the group consisting of carbon fiber, carbon nanotubes, carbon nanowires, soft carbon, hard carbon, and combinations thereof.

5. The negative active material of claim 1, wherein the active metal particles have an average particle diameter of about 50 µm or less.

6. The negative active material of claim 5, wherein the active metal particles have an average particle diameter ranging from about 1 to about 10 µm.

7. The negative active material of claim 1, wherein the carbon-based material has an average particle diameter ranging from about 100 nm to about 1 µm.

8. The negative active material of claim 1, wherein a ratio of a thickness of the crack inhibiting layer to an average particle diameter of the active metal particles ranges from about 1/1000 to about 1/2.

9. The negative active material of claim 8, wherein a ratio of a thickness of the crack inhibiting layer to an average particle diameter of the active metal particles ranges from about 1/100 to about 1/10.

10. A rechargeable lithium battery comprising:
    a negative electrode comprising a negative active material comprising:
        an active metal core consisting essentially of active metal particles; and
        a crack inhibiting layer comprising a crystalline carbon-based material having changeable pores configured to be compressed when the rechargeable lithium battery is being charged and to be decompressed when the rechargeable lithium battery is being discharged, the crystalline carbon-based material physically contacting a surface of the active metal core, wherein the carbon-based material has an average particle diameter ranging from about 5 nm to about 5 µm;
    a positive electrode including a positive active material capable of reversibly intercalating and deintercalating lithium; and
    an electrolyte.

11. The rechargeable lithium battery of claim 10, wherein the active metal core comprises an active metal selected from the group consisting of Si, Sn, Al, Zn, Pb, Bi, Ag, Cd, Sb, and combinations thereof.

12. The rechargeable lithium battery of claim 10, wherein the carbon-based material is selected from the group consisting of carbon fiber, carbon nanotubes, carbon nanowires, soft carbon, hard carbon, and combinations thereof.

13. The rechargeable lithium battery of claim 10, wherein the active metal particles have an average particle diameter of about 50 µm or less.

14. The rechargeable lithium battery of claim 10, wherein the carbon-based material has an average particle diameter ranging from about 100 nm to about 1 µm.

15. The rechargeable lithium battery of claim 10, wherein a ratio of a thickness of the crack inhibiting layer to an average particle diameter of the active metal particles ranges from about 1/1000 to about 1/2.

* * * * *